(12) United States Patent
 Gorsuch

(10) Patent No.: US 9,392,484 B2
(45) Date of Patent: *Jul. 12, 2016

(54) WIRELESS COMMUNICATION SYSTEM HAVING MOBILITY-BASED CONTENT DELIVERY

(71) Applicant: IPR Licensing, Inc., Wilmington, DE (US)

(72) Inventor: Thomas E. Gorsuch, Merritt Island, FL (US)

(73) Assignee: IPR Licensing, Inc., Wilmington, DE (US)

( * ) Notice: Subject to any disclaimer, the term of this patent is extended or adjusted under 35 U.S.C. 154(b) by 163 days.

This patent is subject to a terminal disclaimer.

(21) Appl. No.: 14/258,684

(22) Filed: Apr. 22, 2014

(65) Prior Publication Data

US 2014/0226627 A1     Aug. 14, 2014

Related U.S. Application Data

(63) Continuation of application No. 12/476,377, filed on Jun. 2, 2009, now Pat. No. 8,725,172, which is a continuation of application No. 11/415,003, filed on May 1, 2006, now Pat. No. 7,542,771, which is a continuation of application No. 11/119,658, filed on May 2, 2005, now Pat. No. 7,039,424, which is a continuation of application No. 09/845,241, filed on Apr. 30, 2001, now Pat. No. 6,985,746.

(51) Int. Cl.
*H04W 28/02* (2009.01)
*H04W 36/00* (2009.01)
(Continued)

(52) U.S. Cl.
CPC ........... *H04W 28/0226* (2013.01); *G06Q 30/06* (2013.01); *H04L 47/24* (2013.01); *H04L 69/22* (2013.01); *H04M 3/4938* (2013.01); *H04M 15/00* (2013.01); *H04M 15/16* (2013.01);

*H04M 15/745* (2013.01); *H04M 15/80* (2013.01); *H04M 15/8016* (2013.01); *H04M 15/8033* (2013.01); *H04M 15/8214* (2013.01); *H04W 4/04* (2013.01); *H04W 4/24* (2013.01); (Continued)

(58) Field of Classification Search
CPC ...................... H04W 28/0226; H04W 36/0072
See application file for complete search history.

(56) References Cited

U.S. PATENT DOCUMENTS

| 5,235,633 A | 8/1993 | Dennison et al. |
| 5,255,307 A | 10/1993 | Mizikovsky |

(Continued)

FOREIGN PATENT DOCUMENTS

| EP | 0 703 463 | 3/1996 |
| GB | 2 332 821 | 6/1999 |

(Continued)

OTHER PUBLICATIONS

Lynch et al., "Internet System Handbook," 1st ed., Impress Holdings, Inc., pp. 339-340 (Aug. 11, 1996).

(Continued)

*Primary Examiner* — Rasheed Gidado
(74) *Attorney, Agent, or Firm* — Volpe and Koenig, P.C.

(57) ABSTRACT

A portable subscriber access unit includes a wireless transceiver and a processor. The processor controls the transceiver, determines a mobility state of the access unit, and determines a data packet content type. The transceiver transmits the mobility state, receives service rights based on the mobility state, and transmits the data packet on a condition that the content type is allowed by the service rights.

22 Claims, 7 Drawing Sheets

(51) Int. Cl.
*G06Q 30/06* (2012.01)
*H04L 12/851* (2013.01)
*H04M 3/493* (2006.01)
*H04M 15/00* (2006.01)
*H04M 15/16* (2006.01)
*H04W 4/04* (2009.01)
*H04W 4/24* (2009.01)
*H04L 29/06* (2006.01)

(52) U.S. Cl.
CPC .. *H04W36/0072* (2013.01); *H04M 2215/0108* (2013.01); *H04M 2215/0152* (2013.01); *H04M 2215/0168* (2013.01); *H04M 2215/206* (2013.01); *H04M 2215/2013* (2013.01); *H04M 2215/2026* (2013.01); *H04M 2215/22* (2013.01); *H04M 2215/32* (2013.01); *H04M 2215/7414* (2013.01); *H04M 2215/7435* (2013.01); *H04M 2215/782* (2013.01)

(56) References Cited

U.S. PATENT DOCUMENTS

| | | | |
|---|---|---|---|
| 5,539,395 A | | 7/1996 | Buss et al. |
| 5,590,133 A * | | 12/1996 | Billstrom .............. H04W 48/20 370/332 |
| 5,711,005 A * | | 1/1998 | Farrag .................. H04W 72/02 455/441 |
| 5,787,348 A * | | 7/1998 | Willey .................. H04W 36/04 342/104 |
| 5,826,014 A | | 10/1998 | Coley et al. |
| 5,857,201 A | | 1/1999 | Wright, Jr. et al. |
| 5,896,411 A | | 4/1999 | Ali et al. |
| 5,914,668 A | | 6/1999 | Chavez, Jr. et al. |
| 5,970,403 A | | 10/1999 | Alperovich et al. |
| 6,032,044 A | | 2/2000 | Shannon et al. |
| 6,044,261 A | | 3/2000 | Kazmi |
| 6,044,273 A | | 3/2000 | Tekinay |
| 6,070,184 A | | 5/2000 | Blount et al. |
| 6,072,787 A | | 6/2000 | Hamalainen et al. |
| 6,075,797 A | | 6/2000 | Thomas |
| 6,091,956 A | | 7/2000 | Hollenberg |
| 6,169,898 B1 * | | 1/2001 | Hsu ....................... H04W 28/24 455/432.3 |
| 6,223,027 B1 * | | 4/2001 | Ono ....................... H04W 84/02 455/412.1 |
| 6,240,455 B1 | | 5/2001 | Kamasaka et al. |
| 6,324,404 B1 | | 11/2001 | Dennison et al. |
| 6,374,112 B1 | | 4/2002 | Widegren et al. |
| 6,414,776 B1 | | 7/2002 | Omata |
| 6,463,274 B1 | | 10/2002 | Robertson |
| 6,574,456 B2 | | 6/2003 | Hamabe |
| 6,611,688 B1 | | 8/2003 | Raith |
| 6,907,225 B1 | | 6/2005 | Wilkinson |
| 6,909,891 B2 | | 6/2005 | Yamashita et al. |
| 6,947,746 B2 | | 9/2005 | Watanabe |
| 7,042,855 B1 * | | 5/2006 | Gilchrist ............... H04W 76/02 370/328 |
| 7,072,662 B2 | | 7/2006 | Naruse |
| 7,082,304 B2 | | 7/2006 | Wakabayashi |
| 2002/0122402 A1 * | | 9/2002 | Periyalwar ............ H04W 40/02 370/342 |
| 2003/0003960 A1 | | 1/2003 | Shoji et al. |
| 2009/0262701 A1 | | 10/2009 | Motegi et al. |

FOREIGN PATENT DOCUMENTS

| | | |
|---|---|---|
| JP | 56-110356 A2 | 9/1981 |
| JP | 09-062594 | 3/1997 |
| JP | 09-187078 | 7/1997 |
| JP | 10-023510 | 1/1998 |
| JP | 10-257555 A2 | 9/1998 |
| JP | 10-261989 | 9/1998 |
| JP | 11-113041 | 4/1999 |
| JP | 11-127469 | 5/1999 |
| JP | 2000-023250 | 1/2000 |
| JP | 2000-032561 | 1/2000 |
| JP | 2000-224640 | 8/2000 |
| JP | 2000-253180 | 9/2000 |
| JP | 2000-270015 | 9/2000 |
| JP | 2000-341752 | 12/2000 |
| JP | 2001-036960 | 2/2001 |
| JP | 2001-078264 | 3/2001 |
| JP | 2001086190 A2 | 3/2001 |
| WO | 97/21318 | 6/1997 |
| WO | 99/57879 | 11/1999 |
| WO | 00/16579 | 3/2000 |
| WO | 00/38469 | 6/2000 |

OTHER PUBLICATIONS

Ralph, D. and Shepard, C., "Services via Mobility Portals," 3G Mobile Communication Technologies, Mar. 26-28, 2001, Conference Publication No. 477, IEEE 2001, pp. 38-43.

* cited by examiner

MOBILITY STATE

| PRICING PLAN | STATIONARY | PEDESTRIAN | MOBILE |
|---|---|---|---|
| I | FULL | NONE | NONE |
| II | FULL | PARTIAL | NONE |
| III | FULL | FULL | NONE |
| IV | FULL | PARTIAL | PARTIAL |
| V | FULL | FULL | PARTIAL |
| VI | FULL | FULL | FULL |

FIG. 3

WIRELESS COMMUNICATION SYSTEM HAVING MOBILITY-BASED CONTENT DELIVERY

CROSS REFERENCE TO RELATED APPLICATIONS

This application is a continuation of U.S. patent application Ser. No. 12/476,377 filed Jun. 2, 2009, which is a continuation of U.S. patent application Ser. No. 11/415,003, filed on May 1, 2006, which issued as U.S. Pat. No. 7,542,771 on Jun. 2, 2009, which is a continuation of U.S. patent application Ser. No. 11/119,658, filed on May 2, 2005, which issued as U.S. Pat. No. 7,039,424 on May 2, 2006, which is a continuation of U.S. patent application Ser. No. 09/845,241, filed on Apr. 30, 2001, which issued as U.S. Pat. No. 6,985,746 on Jan. 10, 2006, the contents of which are hereby incorporated by reference herein.

FIELD OF THE INVENTION

This application is related to wireless communication.

BACKGROUND

Demand for wireless communications equipment and services continues to grow at an unprecedented rate throughout the world. Increasingly, such systems are commonly relied upon to provide voice and data communications to a growing sector of the public. While these systems originally depended upon analog signaling technology, there is essentially unanimous agreement that future systems will be based on various types of digital signal coding schemes.

The typical wireless communication system is a point-to-multipoint type system in which a central base station communicates with a number of remote units located within a local geographic area of coverage known as a cell. This system provides for duplex communication such that signals may be sent in both a forward direction (from the base station to the remote unit) as well as in a reverse direction (from the mobile remote unit back to the base station). In order to support communication between the remote unit and networks such as the Public Switched Telephone Network (PSTN), or data networks such as the Internet, the wireless system must also provide for various logical components and functional entities.

Consider the Code Division Multiple Access (CDMA) and Time Division Multiple Access (TDMA) digital systems presently in widespread use. Each of these systems provides for certain logical types of the radio channels that make up the forward link and reverse link. In particular, the forward link channels often include a pilot channel, paging channels, and multiple forward traffic channels. The traffic channels are used to carry the payload data between the base station and the mobile unit. A pilot channel is also typically required to allow the remote unit to maintain synchronization with the base station. The paging channels provide a mechanism for the base station to inform the remote unit of control information, such as the assignment of forward traffic channels to particular connections and/or subscriber units.

Likewise, an access channel is provided in the reverse direction in addition to reverse traffic channels. The access channels allow the remote units to communicate control information with the base station, such as to send messages indicating the need to allocate or deallocate connections as required.

Various environmental conditions can affect the performance of any wireless communications system. These elements include atmospheric signal path loss, which may often introduce fading and interference. Fading may include variations that are introduced as a result of the specific terrain within the cell, as well as other types of fading, such as multipath fading, that occurs due to signal reflections from specific features, such as buildings that cause fluctuations in received signal strength. Systems in which the remote unit may be a mobile unit, especially those potentially operating at higher speeds, such as the cellular telephones used in automobiles, are particularly susceptible to multi-path fading. In such an environment, the signal pathways are continually changing at a rapid rate.

A similar impact on performance can result from movement of the subscriber units relative to the base station. Motion can make it difficult for the base station to precisely locate the subscriber unit. In addition, the signal pathways continuously change at a rate proportional to the mobility rate. To maintain a wireless link, additional power and traffic channels may have to be allocated to the moving subscriber. This additional allocation of wireless resources removes resources that would otherwise be available to other subscribers. This negative impact on other subscribers is more acutely felt during rapid movement and when attempting to maintain high data rates across the wireless link.

SUMMARY

Embodiments of the invention reduce the impact of motion and similar phenomenon on the wireless user community as a whole. The system employs pricing tiers, which represent each subscriber=s mobility-based privileges to specific content. That is, a mobile user can be charged a premium to maintain the same quality of service as a stationary user. The impact of mobility is thus felt by the mobile subscriber, either by experiencing reduced bandwidth or through higher subscription fees.

A particular embodiment of the invention includes a method of delivering content to a portable wireless device. A wireless communication link is established between a portable device and a base station. The communication link can include a Code Division Multiple Access (CDMA) based protocol.

A mobility state of the portable device is then detected. More specifically, the mobility state is selected from at least three mobility states, including stationary, pedestrian, and mobile.

Based on the detected mobility state, limited content may be transmitted over the communication link. Each mobility state is associated with at least one pricing plan from a plurality of available pricing plans. This can include defining, for each pricing plan, a respective set of deliverable content types based on the mobility state.

In addition, a representation of the deliverable content types can be displayed to a user of the portable wireless transceiver.

Aspects of the invention can be embodied in a computing system for affecting the transmission of content over a wireless communication link. There being a portable wireless transceiver in communication with the wireless communication link. The portable wireless transceiver including an associated level of service and a mobility state. A computer program routine operates on the level of service and the mobility state to affect the rate of data transmitted over the wireless communication link.

The level of service can be based on a pricing plan associated with the portable wireless transceiver. More particularly, the level of service can identify a plurality of allowed content types transmittable over the wireless communication link. Each allowed content type may be identified by a respective service port number, a respective protocol identifier, or a respective file type.

The mobility state can be selected from at least three mobility states. In addition, the mobility state can be computed from a metric associated with the wireless communication link or from mobility data in the portable wireless transceiver.

The computer program routine can determine a disallowed transmission. The computer program routine can then block transmission of the disallowed transmission over the wireless communication link.

A more particular communication system includes a wireless base station transceiver and a portable wireless transceiver in communication over a wireless link. A computer can be coupled to the portable wireless transceiver. The portable wireless transceiver can have an associated pricing plan. Data can be transmitted between the transceivers over the wireless link.

In addition, a mobility processing routine in the base station can store a mobility state for the portable wireless transceiver. The mobility state can computed by a processor in the base station. In particular the mobility state can be computed from data derived from the performance of the wireless communication link or from data provided by the portable wireless transceiver.

A content filter can also be included for blocking data from transmission over the wireless link based on the pricing plan and the mobility state. The content filter can further block data based on a content type associated with the data. The content type can represented by a service port number, a message protocol, or a file type.

A gateway can also be disposed between the base station and a wide area network. The gateway can include the content filter.

BRIEF DESCRIPTION OF THE DRAWINGS

The foregoing and other objects, features and advantages of the Wireless Communication System Having Mobility-Based Content Delivery will be apparent from the following more particular description of embodiments of the invention, as illustrated in the accompanying drawings in which like reference characters refer to the same parts throughout the different views. The drawings are not necessarily to scale, emphasis instead being placed upon illustrating the principles of the invention.

FIG. 3 illustrates an example service rights table of FIG. 1.

DETAILED DESCRIPTION

Figure 1:
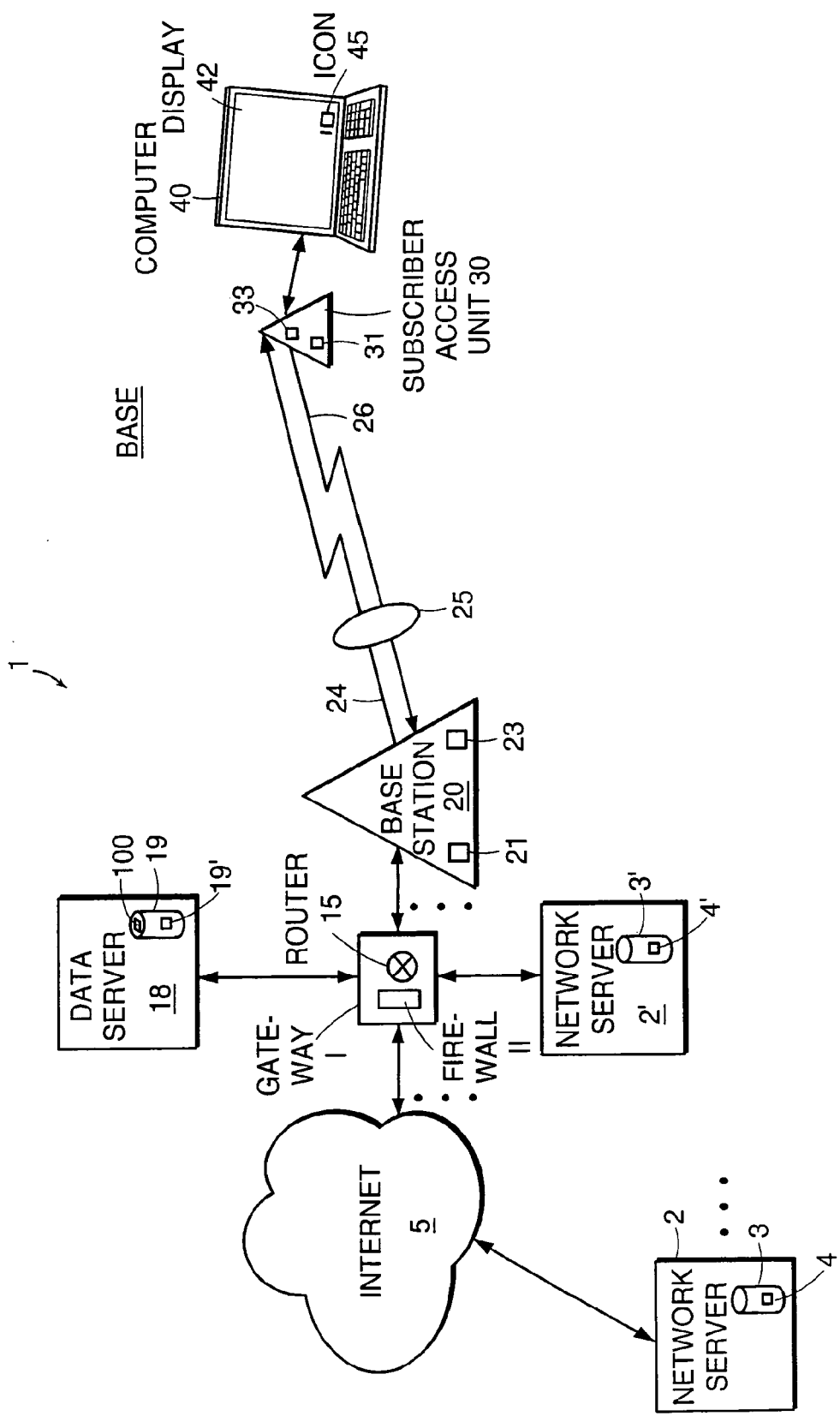
FIG. 1 is a block diagram of a particular communication system suitable for practicing embodiments of the invention.

FIG. 1 is a block diagram of a particular communication system suitable for practicing embodiments of the invention.

As shown, one or more network servers 2 are in communication with a Wide Area Network (WAN), such as the Internet 5. Each network server 2 typically includes a data store 3 for storing information content 4. The network servers 2 communicate and exchange information with remote clients over the network 5. To that end, the network servers 2 can include a Web server for providing Web-based content to an end-user.

The communication system 1 interfaces to the WAN 5 through one or more gateway processors 10. Each gateway 10 typically includes a firewall 11 for protecting the communication system 1 from unauthorized packets and a router or switch for directing messages to and from one or more base stations 20. The gateway 10 can also route messages to and from a local network server 2-1 having a content database 3-1 that stores content 4-1, and a data server 18 having a database or data warehouse 19 that stores data such as a service rights database 100 (discussed in detail below) and a mobility database 190 (discussed in detail below).

Each base station 20 includes a base station processor 21 controlling a wireless transceiver 23 for communicate with a plurality of subscriber access units (SAU) 30 over a wireless communications link. For illustrative purposes, only a single subscriber access unit 30 having a wireless communication link 25 is shown. The wireless communications link 25 includes a forward link 24 from the base station 20 to the subscriber access unit 30 and a reverse link 26 from the subscriber access unit 30 to the base station 20.

The subscriber access unit 30 is portable and includes a subscriber processor 31 for controlling a wireless transceiver 33 for communicating over the wireless link 25. The subscriber access unit 30 can be in communication with a computing device 40, such as a laptop computer, a desktop computer, a personal digital assistant, an Internet appliance, or another suitable device. It should be recognized by those of ordinary skill in the art that the subscriber access unit 30 and computing device 40 can be integrated into a single package, such as an Internet-enabled telephone. It should also be recognized that the subscriber access units 30 need not be identical.

The communication system 1 is a demand access, point-to-multipoint wireless communication system. That is, the computers 40 can transmit data to and receive data from the network servers 2, 2-1 through bidirectional wireless connections implemented over the forward links 24 and the reverse links 26. It should be understood that in a point-to-multipoint multiple access wireless communication system 1 as shown, a given base station 20 typically supports communication with a number of different subscriber access units 30, in a manner that is similar to a cellular telephone communication network.

Also, as noted above, the gateway 10 can be in communication with a plurality of base stations 20. It should be recognized by one of ordinary skill in the art that each base station 20 can interface to the WAN 5 through a respective gateway 10. In that case, the plurality of gateways 10 can employ tunneling protocols to exchange subscriber data as a subscriber access unit 30 transitions from one base station to another base station.

In accordance with a particular embodiment of the invention, the wireless communications link 25 adheres to a standard digital wireless protocol, such as Code Division Multiple Access (CDMA) based protocols. The techniques described herein can also be applied to other wireless protocols, including Time Division Multiple Access (TDMA) based protocols. Those of ordinary skill in the art should recognize that other standard protocols or proprietary protocols may also be used in practicing the invention.

Figure 2:
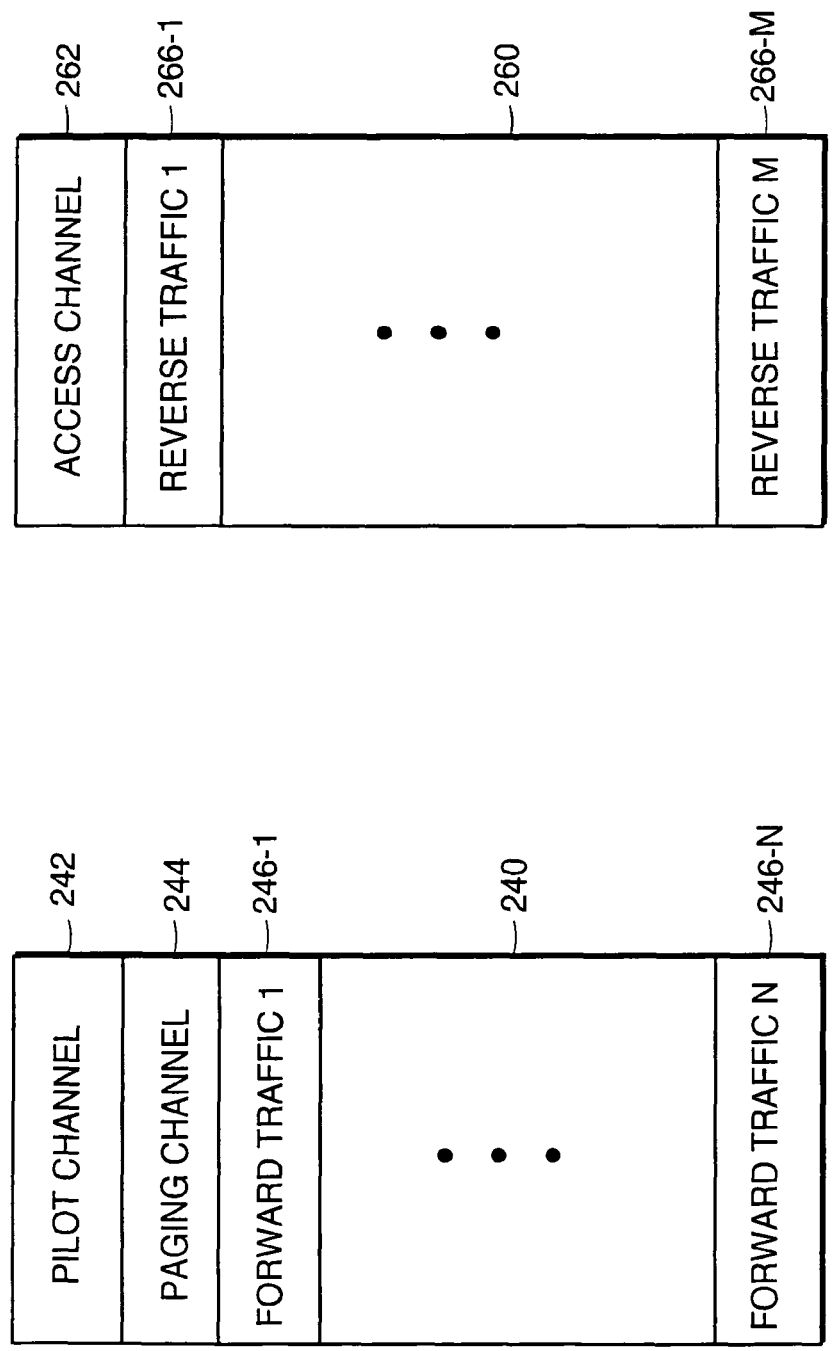
FIG. 2A is a block diagram of a particular forward wireless link 240.
FIG. 2B is a block diagram of a particular reverse wireless link 260.

FIG. 2A is a block diagram of a particular forward wireless link 240. In accordance with CDMA technology, the forward link includes a pilot channel 242, a paging channel 244, and a plurality of forward traffic channels 246-1, ..., 246-N. The base station 20 assigns forward traffic channels 246 to a subscriber access unit 30 based on quality of service parameters. In particular, a subscriber access unit 30 may require an increasing number of forward traffic channels 246 to maintain a desired bit rate.

FIG. 2B is a block diagram of a particular reverse wireless link 260. In accordance with CDMA technology, the reverse link includes an access channel 262 and a plurality of reverse traffic channels 266-1, ..., 266-M. As with the forward traffic channels 246, the number of reverse traffic channels 266 may depend on a desired bit rate.

In a CDMA architecture, assigning more channels to a particular subscriber access unit 30 reduces the resources available to other subscriber access units. This can degrade the quality of service provided to the other users. One occasion where a subscriber access unit may request additional traffic channels is in a mobile environment. As a subscriber access unit 30 moves, it becomes harder for the stationary base station 20 to provide data to the subscriber access unit 30. The base station, to compensate, may increase power and assign additional traffic channels to the wireless communications link 25. A stationary subscriber access unit 30, in comparison, may achieve an identical data rate while consuming lower power and fewer traffic channels. It is desired that the base station 20 not penalize stable or more stationary subscribers in order to serve one or more mobile units. It should be noted, however, that even stationary subscribers can appear to be mobile to the base station due to various electromagnetic interferences that may be local to the stationary subscriber access unit 30 or in the path of the wireless link 25.

In accordance with embodiments of the invention, a subscriber=s quality of service can depend on a pricing plan or level. That is, a mobile user can be charged a premium to maintain the same quality of service as a stationary user. In accordance with a particular embodiment of the invention, three mobility levels are defined: stationary, pedestrian, and mobile. The definitions and technical distinctions between the three mobility levels are an engineering choice based on the particulars of the host wireless communications system. Similarly, details on the pricing plan are largely an engineering and marketing choice based on the technical parameters of the communications system and the demographics of the customer base.

FIG. 3 illustrates an example service rights table. As shown in the table 100, there are three columns representing the three defined mobility states 110: stationary, pedestrian, mobile. The rows represent the available pricing plans 120. The table=s data fields identify the service rights for the subscriber. In a particular embodiment, the data fields are bit maps of the service rights.

In this simplified example, a subscriber can obtain three tiers of service in the pedestrian and mobile states: full-service, partial service, or no service. For example, at pricing plan II, the subscriber receives full-service while stationary, limited service while operating at pedestrian levels, and no service when fully mobile. The issue then becomes how to divide content across the three mobility states. In a particular embodiment of the invention, content is provided to the subscriber access unit in accordance with protocols that adhere to the Open Systems Interconnect (OSI) model. More particularly, the communications system 1 adheres to be TCP/IP standards. The approach to selecting content is thus chosen to follow TCP/IP standards and Internet conventions.

Figure 4:
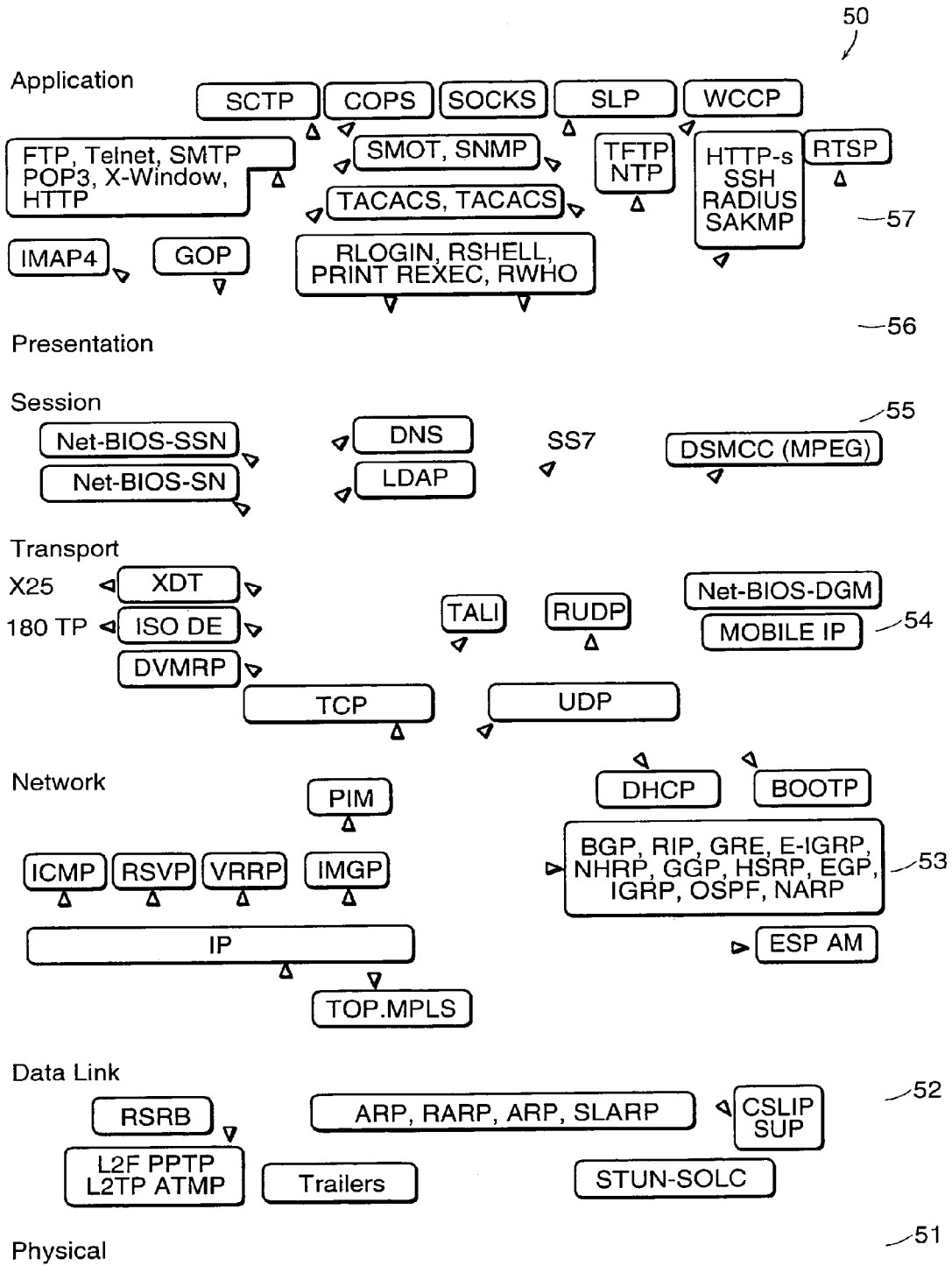
FIG. 4 is a block diagram of Internet protocols in the OSI architecture model.

FIG. 4 is a block diagram of Internet protocols in the OSI architecture model. As shown, the OSI architecture 50 includes seven protocol layers: a physical layer 51, a data layer 52, a network layer 53, a transport layer 54, a session layer 55, a presentation layer 56, and an application layer 57. Each layer can include a plurality of protocols. In general, content is exchanged between applications at the application layer 57. For transmission to a receiving application, the content is formatted according to a particular application protocol and encapsulated by lower-level protocols. When received at a destination, the lower level protocols are removed to expose the content. To reduce the size of messages transmitted between network computers, the content is divided into small units and delivered as packets. Across the Internet 5, the packets adhere to the Internet protocol (IP). In practice, the gateway 10 can also communicate with the local network server 2-1, the data server 18 and the base station using TCP/IP standards.

Because the impact on other subscribers is most acute when wireless resources, such as power and channel allocations, are commandeered by subscribers requesting high data rates over a relatively long period of time, the services provided can be chosen or excluded in response to the requested bandwidth. In such a case, a wireless metric can be chosen as the product of power, channels, and saturation of users in the particular cell. In effect, a subscriber=s mobility can be used to impact power and channel allocations to that subscriber based on the service rights table 100.

Such an approach, however, implies knowledge of the payload content in individual packets. Furthermore, the gateway 10 may need to estimate the impact of delivering the packet on other subscribers. These tasks are complicated by the fact that the packets may arrive out of order. It is usually up to the destination host (i.e., the computer 40) to determine whether all packets have been received and the final size of the content payload. Analyzing this data upstream from the destination host adds additional, and possibly redundant, processing to the gateway 10.

Another approach is to make delivery choices based on a broader nature of the content, such as file type. It is recognized that certain file types may be more demanding of bandwidth than other file types. For example, a script generally has very little content—it commands software already on the computer 40 to perform a predefined function. Text content may also be less bandwidth intensive, whether the text is provided as part of a HyperText Markup Language (HTML) file, an electronic mail message, or a short message. In contrast, streaming audio and video content can be assumed to be very bandwidth intensive.

Files transported by the File Transfer Protocol (FTP) add additional complexity. First, these files may have an indeterminate size. Second, the files may be compressed by the application program so that the underlying file type may not be discernible from the packetized information. It is less important to the users, however, that this content be provided quickly. In other words, downloaded data files could be passed through to the subscriber using a limited, or slow, data rate.

Because lower level protocols encapsulated higher level protocols, each protocol can be identified within a packet. For example, an HTML file should adhere to the HyperText Transport Protocol (HTTP) at the application layer 170. Similarly, streaming data should adhere to the real-time streaming protocol (RTSP) at the application layer 170. By unpacking the received IP packets, the communications system 1 can identify the underlying application protocol.

Unpacking every packet, although effective, introduces additional processing at the gateway 10 and base station 20 nodes of the communications system 1. Fortunately, another broad measure of a packet=s payload content is provided by a service port number, which is generally examined by intermediate computers, especially the gateway 10. For example, port 80 generally designates HTTP or browser activity.

In accordance with a particular embodiment of the invention, the gateway 10 identifies the content as part of its routing or firewall processing. The gateway 10 is then responsible for determining whether or not to deliver the packet to the subscribers respective base station 20. To facilitate this processing, a mobility table 190 is maintained by the gateway 10 and the base stations 20. The database table 190 is stored in the data warehouse 19 of the data server 18 as a relational database table.

Figure 5:
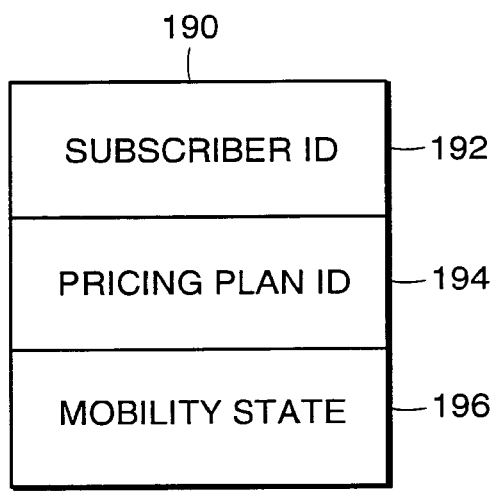
FIG. 5 is a schematic diagram of the mobility database of FIG. 1.

FIG. 5 is a schematic diagram of the mobility database 190. Shown are three fields, a subscriber identification field 192, a pricing plan identifying field 194, and a mobility level identification field 196. For each subscriber, the pricing plan is fixed by a systems administrator so that the pricing data identification field 194 indicates the subscribers chosen pricing plan, as reflected in the service rights table 100. The mobility level is, in contrast, dynamic. The base station currently responsible for a particular subscriber periodically updates the mobility level indication field 196 in the mobility database 190 based on the subscriber access unit=s 30 current mobility state.

Figure 6:
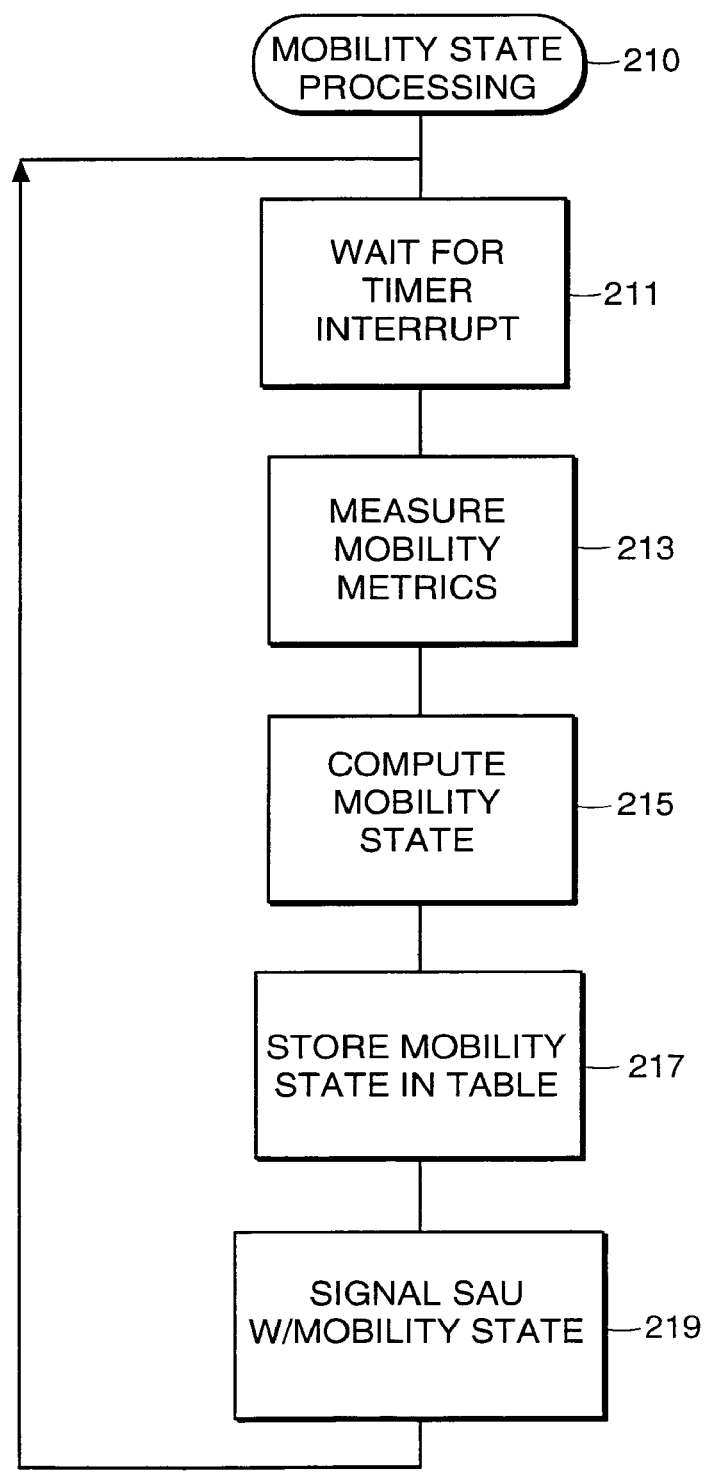
FIG. 6 is a flowchart of a particular mobility state processing routine.

FIG. 6 is a flowchart of a particular mobility state processing routine. Detection of a user=s mobility state can be performed by the base station processor 20. The routine 210 periodically computes a mobility state for each subscriber access unit. Each iteration is initiated by a timer interrupt at step 211.

Any suitable technique can be used to determine the mobility state, including mobility detection at the subscriber access unit 30 (such as from a mercury switch) and data computed from the reverse access channel 262 or reverse traffic channels 266. At step 213, the routine 210 measures mobility metrics specific to the applicable methods employed in the system and the subscriber access unit 30.

From the mobility metrics, the routine computes a mobility state at step 215. Again, the computed state may reflect actual motion of the subscriber access unit or degraded performance due to interference. At step 217, the computed mobility state is stored in the subscriber=s mobility field of the mobility table 190.

Because the subscriber may not be moving, the routine 210 can forward messages to the subscriber access unit 30 at step 219 to indicate the current mobility state and service level. This information can be displayed to the subscriber using the computer 40. In particular, an icon 45 (FIG. 1) representing the current mobility state is rendered on the subscriber=s computer display 42. The subscriber may select the icon to display details of the current level of service.

Figure 7:
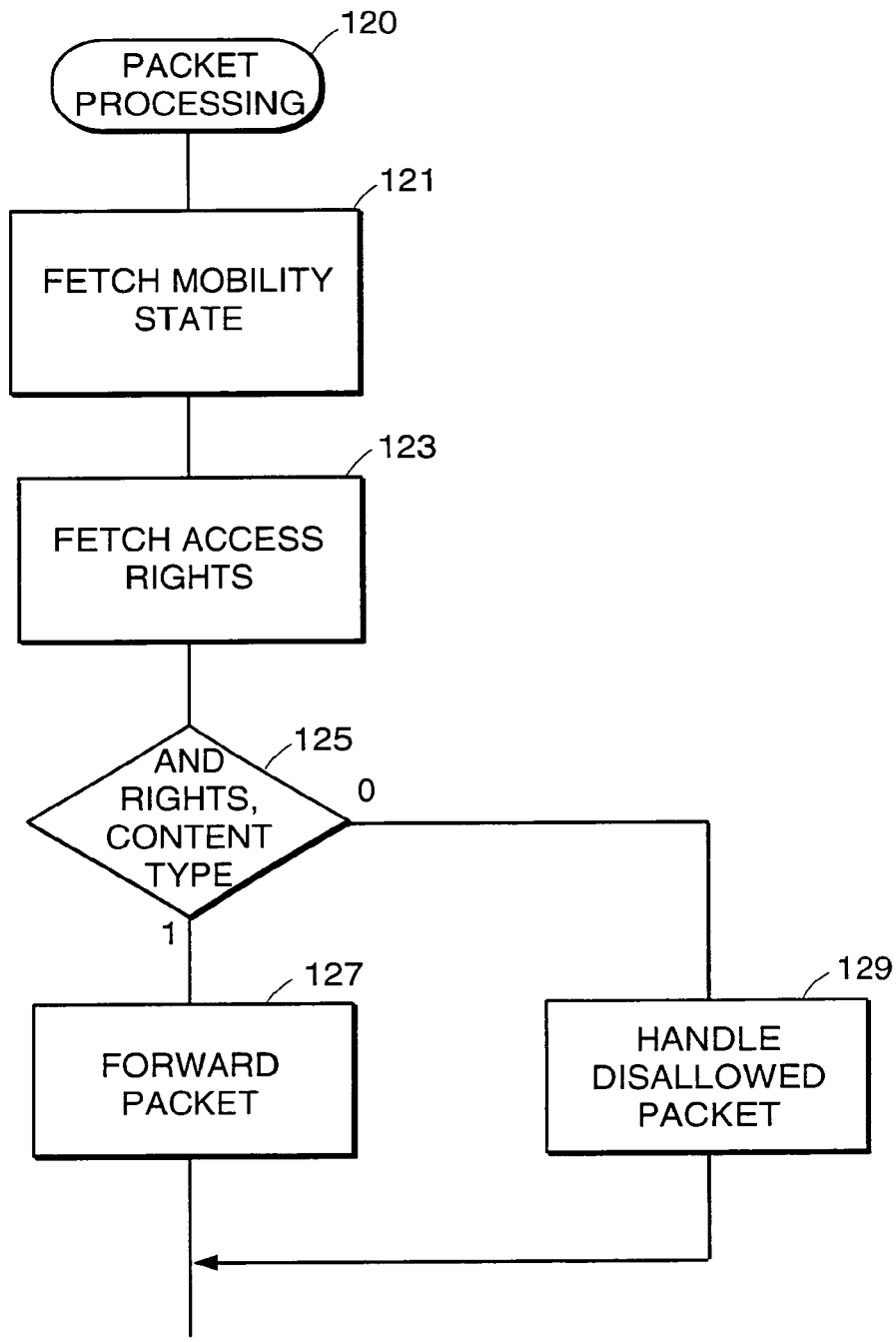
FIG. 7 is a flowchart of a particular packet processing routine.

FIG. 7 is a flowchart of a particular packet processing routine. Each packet can be processed by the gateway 10 (FIG. 1) during its firewall processing. The packet processing routine 120 begins at step 121, where the mobility state of the destination subscriber access unit 30 is determined. This is accomplished by accessing the mobility table 190 using the subscriber=s identification as a key and then fetching the mobility state 196 and pricing plan 194 from the record.

At step 123, the routine 120 looks up the allowed services from the service rights table 100 based on the fetched pricing plan and the mobility state values. The result is an allowed service bitmap.

Once the allowed services are identified, the associated bitmap can be used to filter the content. At step 125, the allowed service bitmap is logically ANDed with the content type from the packet. If the subscriber access unit 30 is allowed to receive this content (AND result is 1), the packet is transmitted over the forward traffic channels to the subscriber access unit at step 127. If, however, the packet cannot be forwarded to the subscriber access unit 30 (AND result is 0), the gateway 10 performs further processing in response to the disallowed packet at step 129.

In response to a disallowed packet, the gateway 10 can queue the packet in the data warehouse 19 for possible later delivery to the subscriber access unit 30. This would involve additional overhead to store and manage the queued data packets. Another approach more consistent with Internet conventions is to return an Internet control message to the source host of the content advising the source to halt further content delivery. This can be accomplished using, for example, the destination unreachable message in the Internet Control Message Protocol (ICMP). Alternatively, an ICMP squelch message can be sent to the source server 2, 2-1 to reduce the throughput of the packets to more closely match the wireless bandwidth allocated to the subscriber access unit 30.

Although the packet processing routines 120 has been described as being processed by the gateway 10, the routine may be processed in whole or in part by the base station processor 20 associated with the subscriber access unit 30. In practice, there is an engineering choice between overburdening the gateway 10 and overburdening the data path between the gateway 10 and the base station processor 20. It is expected that the additional processing in the gateway 10 will not add appreciable latency to the throughput of the content. This is especially true when each base station 20 is in communication with a dedicated gateway 10.

The above description of embodiments focuses on the content being forwarded to the subscriber access unit 30. It appreciated that the system can be adapted to also address requests from the subscriber access unit 30. That is, the base station 20 can drop requests for content that are inconsistent with the subscriber=s current service level as determined from the service rights table 100. For example, a mobile level I subscriber cannot, according to the example service rights table 100, receive or request any content. Any HTTP request from the subscriber can therefore be blocked by the base station, without having to wait for the request to be serviced by a server 2, 2-1 and then blocking the content. Because a subscriber=s mobility state can change after the request is sent, the content should still be blockable—regardless of the mobility state at the time the request was sent.

A particular embodiment, therefore, verifies reverse-directed packets (away from the SAU 30) as well as forward-directed packets (toward the SAU 30). More particularly, disallowed service port activity is blocked regardless of the message source. This processing can be consolidated in the gateway 10 and base station 20 nodes.

Limiting forward traffic may be sufficient to maintain an acceptable quality of service for all users. This may be particularly true when the subscriber is web browsing, which only requires the transmission of a short Universal Resource Locator (URL) string over the reverse traffic channels. There are situations, however, when a subscriber attempts to transmit large data files over the reverse traffic channels. An example would be an FTP file transfer.

To preserve the reverse traffic channels, at least a portion of the packet processing routine 120 of FIG. 7 can be replicated on the subscriber access units 30. Because the service rights are computed at the base station 20 and transmitted to the subscriber access unit 30 for display to the user, that processing should not be required at the subscriber access unit 30.

Referring again to FIG. 7, processing at the subscriber access unit 30 can begin at step 125. There the allowed service bitmap is logically ANDed with the content type from the packet. If the subscriber access unit is allowed to transmit this content (AND result is 1), the packet is transmitted over the reverse traffic channels to the base station at step 127. If, however, the packet cannot be transmitted (AND result is 0), at step 129 the subscriber access unit does not transmit the disallowed packet.

Those of ordinary skill in the art should recognize that methods for implementing a Wireless Communication System Having Mobility-Based Content Delivery may be embodied in a computer program product that includes a computer usable medium. For example, such a computer usable medium can include a readable memory device, such as a solid state memory device, a hard drive device, a CD-ROM, a DVD-ROM, or a computer diskette, having computer-readable program code segments stored thereon. The computer readable medium can also include a communications or transmission medium, such as a bus or a communications link, either optical, wired, or wireless, having program code segments carried thereon as digital or analog data signals.

While the system has been particularly shown and described with references to particular embodiments thereof, it will be understood by those of ordinary skill in the art that various changes in form and details may be made therein without departing from the scope of the invention encompassed by the appended claims. For example, the methods of the invention can be applied to various environments, and are not limited to the environment described herein. In particular, the communications system 1 is described such that the shared channel resource is a wireless or radio channel. It should be understood, however, that the techniques described herein may be applied to allow shared access to other types of media, such as telephone connections, computer network connections, cable connections, and other physical media to which access is granted on a demand driven basis.

What is claimed is:

1. A method of mobility based content delivery, the method comprising:
   receiving, at a computing device coupled to a portable wireless transceiver having a communication link with a cellular wireless network, a mobility state of the portable wireless transceiver and a current level of available service, wherein the mobility state reflects actual motion of the portable wireless transceiver;
   displaying an indication of the mobility state of the portable wireless transceiver and an indication of the current level of available service to a user of the computing device;
   displaying a representation of allowable deliverable content types to a user of the computing device; and
   receiving content from the portable wireless transceiver that is an allowable deliverable content type, processing and providing the received content to the user of the computing device.

2. The method of claim 1 wherein the allowable deliverable content type is streaming audio.

3. The method of claim 1 wherein the allowable deliverable content type is text.

4. The method of claim 1 wherein the allowable deliverable content type is a data communication.

5. The method of claim 1 wherein the allowable deliverable content type is a voice communication.

6. The method of claim 1 wherein the allowable deliverable content type is an electronic mail message.

7. The method of claim 1 wherein the allowable deliverable content type is a short message.

8. The method of claim 1 further comprising: receiving content from the portable wireless transceiver that is not an allowable deliverable content type, and notifying a source of the content that a transmission was not provided to the user.

9. The method of claim 1 wherein the current level of available service is based on a pricing plan.

10. The method of claim 1 wherein the current level of available service is affected by one or more of: atmospheric signal path loss, multipath fading, or signal reflections.

11. A system for mobility based content delivery, the system comprising:
    a portable wireless transceiver having a communication link with a cellular wireless network; and
    a computing device coupled to the portable wireless transceiver, wherein the computing device is configured to receive a mobility state of the portable wireless transceiver and a current level of available service, wherein the mobility state reflects actual motion of the portable wireless transceiver;
    wherein the computing device further comprises a display configured to display an indication of the mobility state of the portable wireless transceiver and an indication of the current level of available service to a user of the computing device;
    wherein the display of the computing device is further configured to display a representation of allowable deliverable content types to a user of the computing device;
    wherein the computing device is further configured to receive content from the portable wireless transceiver, wherein the received content is an allowable deliverable content type;
    wherein the computing device is further configured to provide the received content to the user of the computing device.

12. The system of claim 11 wherein the allowable deliverable content type is a voice communication.

13. The system of claim 11 wherein the allowable deliverable content type is a short message.

14. The system of claim 11 wherein the current level of available service is based on a pricing plan.

15. The system of claim 11 wherein the current level of available service is affected by one or more of: atmospheric signal path loss, multipath fading, or signal reflections.

16. A computing device for mobility based content delivery, the computing device comprising:
    an interface configured to couple the computing device to a portable wireless transceiver having a communication link with a cellular wireless network, wherein the computing device is configured to receive a mobility state of the portable wireless transceiver and a current level of available service, wherein the mobility state reflects actual motion of the portable wireless transceiver; and
    a display configured to display an indication of the mobility state of the portable wireless transceiver and an indication of the current level of available service to a user of the computing device;
    wherein the display of the computing device is further configured to display a representation of allowable deliverable content types to a user of the computing device;

wherein the computing device is further configured to receive content from the portable wireless transceiver, wherein the received content is an allowable deliverable content type;

wherein the computing device is further configured to provide the received content to the user of the computing device.

17. The computing device of claim 16, wherein the computing device is selected from a group comprising: a laptop computer, a desktop computer, a personal digital assistant, or an Internet appliance.

18. The computing device of claim 16 wherein the allowable deliverable content type is a voice communication.

19. The computing device of claim 16 wherein the allowable deliverable content type is a short message.

20. The computing device of claim 16 wherein the current level of available service is based on a pricing plan.

21. The computing device of claim 16 wherein the current level of available service is affected by one or more of: atmospheric signal path loss, multipath fading, or signal reflections.

22. The computing device of claim 16 wherein the allowable deliverable content type is an electronic mail message.

\* \* \* \* \*